United States Patent [19]
De Lavalette et al.

[11] 3,743,066
[45] July 3, 1973

[54] FREE WHEEL DRIVE

[75] Inventors: Pierre de Lacroix De Lavalette, Paris; Daniel Hein, Choisy-le-Roi, both of France

[73] Assignee: SKF Compagnie D'Applications Mecaniques, Clamert, France

[22] Filed: July 5, 1972

[21] Appl. No.: 269,224

[52] U.S. Cl. .............................. 192/41 A, 192/45.1
[51] Int. Cl. .......................................... F16d 41/07
[58] Field of Search .......................... 192/41 A, 45.1

[56] References Cited
UNITED STATES PATENTS

| | | | |
|---|---|---|---|
| 1,542,040 | 6/1925 | De Lavaud | 192/41 A |
| 1,694,377 | 12/1928 | De Lavaud | 192/41 A |
| 2,597,241 | 5/1952 | Gruenberg et al. | 192/45.1 |
| 2,614,670 | 10/1952 | Heintz | 192/45.1 |
| 2,824,636 | 2/1958 | Troendly | 192/45.1 |
| 3,019,873 | 2/1962 | Ferris et al. | 192/45.1 |

Primary Examiner—Allan D. Herrmann
Attorney—Joseph F. Brisebois et al.

[57] ABSTRACT

Free wheel drive comprises two concentric cylindrical races and wedging cams maintained in contact with said races by a cylindrical cage and resilient means. The wedging cams have two cylindrical surfaces, one in contact with each of said races. The axes of said cylindrical contact surfaces and the common axis of the two races are generatrices of a cylindrical locus, the diametral plane of which is defined by the common axis of said races and the axis of the cylindrical surface of one of the cams in contact with the internal race.

2 Claims, 3 Drawing Figures

FREE WHEEL DRIVE

SUMMARY OF THE INVENTION

This invention relates to free wheel drives of the type utilizing wedging cams adapted to transmit a torque in only one direction of rotation between two concentric cylindrical races constituted by a ring and a bore.

In the free wheel drives heretofore known it is conventional to use wedging means or cams mounted in one or more cages having openings adapted to the shape and size of the cams. Springs or other resilient means are used to bias the wedging cams and hold them continually in contact with the two races.

The wedging cams of free wheel drives of a conventional type generally have two lateral faces of one shape or another adapted to fit in the cages and cooperate with the aforesaid resilient means. The surfaces of the cams which are urged into contact with the two races are generally part cylindrical.

In free wheel drives the torque is transmitted from one race to another by frictional forces developed at the points of contact between the wedging cams and the two races. In a plane perpendicular to the axis of the races the wedging angle may be defined as being the angle formed between a radius drawn through one of said points of contact and the line joining the two points of contact positioned respectively on the internal and the external races. In other words, the wedging angle is formed between the force perpendicularly applied by the bearing race to the cam and the resultant of this perpendicular force and the frictional force.

In order that the free wheel drive may effectively transmit the desired torque, it is necessary, in accordance with known mechanical principles, that the tangent of the wedging angle be less than the coefficient of friction, which depends in the dry state only on the perpendicular force applied and the nature of the contact surfaces. In the most common case in which the race and the wedging cams are made of a hard steel, experience shows that the wedging angle can not exceed 7° if effective wedging of the cams is to be achieved.

On the other hand, when the wedging angle decreases, the pressure exerted on the surfaces of the races increases. At the limit, if the wedging angle tends toward zero, an infinite pressure on the races is obtained and this results in the deterioration thereof during wedging.

In the free wheel drives of conventional types the wedging angle varies as a function of the swinging of the cams or their height, which may be defined as being the distance separating the two points of contact.

It will thus be seen that, in the free wheel drives of a conventional type, the pressure exerted on the races varies in dependence on the inclination of the cams. Moreover, in order to avoid sliding of the cams it is necessary to select nominal wedging angles which are relatively small so as to be sure not to exceed the value at which wedging no longer takes place. Another disadvantage of conventional devices is that the nominal wedging angle cannot be maintained at a value which is predetermined in advance because of the inevitable imperfections produced during machining of the races and the contact surfaces of the cam. It is therefore necessary to provide a margin of safety sufficient to ensure that the wedging angle always remains less than its maximum permissible value regardless of the tolerances of the components used.

In other devices of a conventional type the centers of the curves of contact of the cams are at an equal distance from the points of contact. While such an arrangement makes it possible to decrease the variations in the wedging angle to a certain extent, these devices do not have the desired practically constant wedging angle.

The free wheel drive according to the present invention makes it possible to overcome these disadvantages and maintain the wedging angle at a practically constant value, which may be selected from within a wider range than the wedging angles of known drives. This results in an improved operation and less wear on the races. Moreover the imperfections produced during the manufacture of the various components which are in contact with each other have practically no influence on the value of the wedging angle and thus on the operation of the free wheel drive. Finally, the shape of the wedging cams according to the invention is so selected that wear on both races is equal, which permits an increase in the life of the free wheel drive.

The free wheel drive according to the present invention comprises, in a conventional manner, two cylindrical concentric races, wedging cams held in contact with said races by means of a cylindrical cage and a resilient device which biases the cams into contact position. The wedging cams of the device according to the invention have two cylindrical contact surfaces, one in contact with each of the races. The axes of these cylindrical contact surfaces are generatrices of a cylindrical locus, the diametral plane of which is defined by the common axis of the two races and the axis of the cylindrical surface of the wedging cam which is in contact with the internal race. As a consequence of this particular arrangement of the axes of the contact surfaces of the wedging cams, a variation in the inclination of the cams produces substantially no variation in the wedging angle.

In a preferred embodiment of the free wheel drive according to the invention, the radius of curvature of those surfaces of the cams in contact with the external races is less than the radius of curvature of those surfaces of the cams in contact with the internal race. The difference between these two radii of curvature is so selected as to balance the Hertz pressures on the two races.

It is well known that the Hertz pressure exerted at the point of contact between two cylindrical surfaces depends on the sum or the difference of the reciprocal of the radii of curvature of these two surfaces. The equality of the pressures on the two races, which guarantees equal wear, may thus be simply obtained by providing such a difference between the radii of curvature of the two contact surfaces of the wedging cams.

The invention will be better understood from a study of a preferred embodiment thereof which will now be described, purely by way of illustration and example, with reference to the accompanying drawings, in which.

Figure 1:
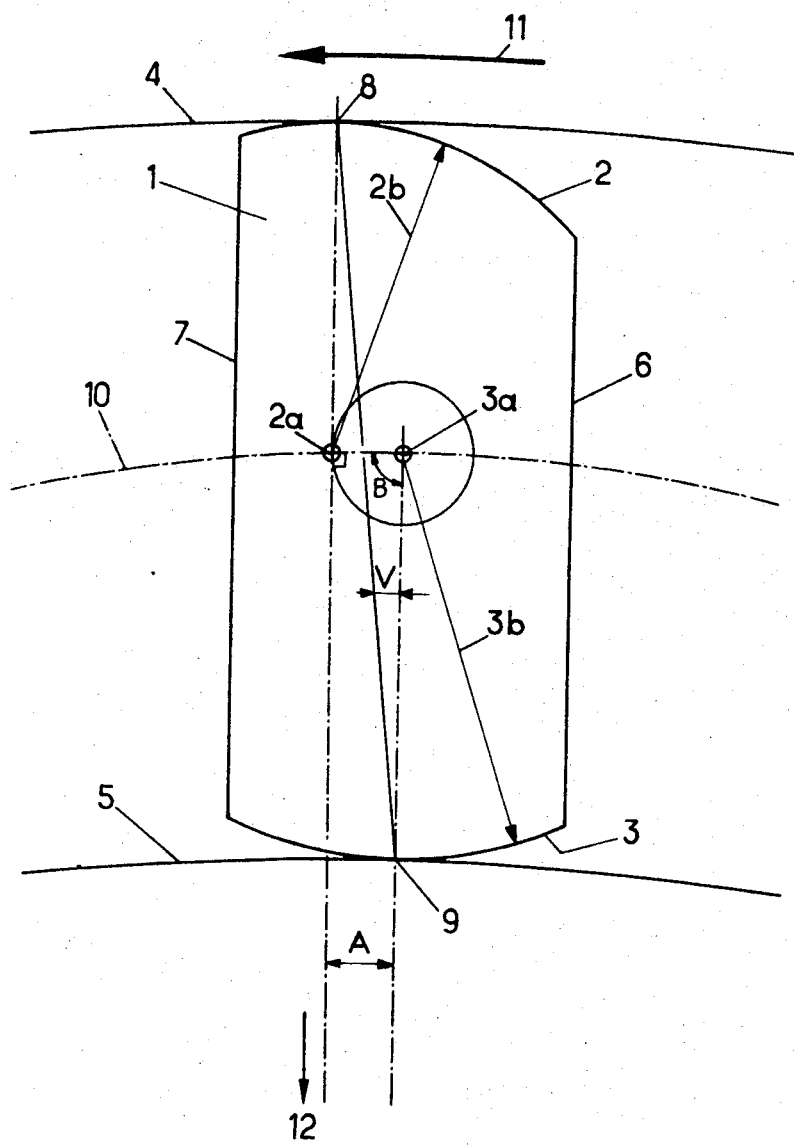
FIG. 1 is a schematic sectional view taken through a wedging cam, the lateral surfaces of which have been simplified.

As shown on FIG. 1, the wedging cam 1 of the free wheel drive according to the invention is in contact through its surfaces 2 and 3 respectively with an external race 4 and an internal race 5. The lateral surfaces 6 and 7 of the wedging cam 1 have been stylized and replaced by planes to simplify the drawings.

The two races 4 and 5 are represented on FIG. 1 by concentric circles, the center 12 of which is positioned outside the figure due to the length of the radii of curvature of these two circles. The contact surfaces 2 and 3 of the cam 1 are also shown on the figure by circles having the centers 2a and 3a respectively and the radii 2b and 3b.

When the wedging cam 1 is in contact with the races 4 and 5 and the forces exerted on the drive are extremely small, the contact between the surfaces 2 and 3 and the races 4 and 5 is linear.

On FIG. 1 it will be seen that the contact is made at the points 8 and 9. The wedging angle V is thus defined between the normal at the point 9 to the bearing race 5 and the line joining the contact points 8 and 9.

When the wedging cam swings, that is to say during the transmission of a torque between the races 4 and 5, the contact surfaces 2 and 3 resiliently deform, as do the races 4 and 5, in a region about the points 8 and 9.

It will be seen in FIG. 1 that the wedging angle V is geometrically related to the angle A formed between the normals to the races 4 and 5 at the points 8 and 9. The tangent of the angle V is related to the tangent of the angle A by a substantially constant coefficient of proportionality which depends only upon the radii of curvature of the two races 4 and 5.

If $R_1$ is the radius of the internal race and $R_2$ is the radius of the external race, it can easily be shown that $tgA = [(R_1 - R_2)/R_1]tgV$        1

In order to avoid any variation in the wedging angle V during swinging of the wedging cam 1 it is therefore advantageous to place the center 2a of the contact surface 2 at the point of tangency between the normal to the race 4 at the point 8 and a circle centered at 3a and having for its radius the distance separating the centers 2a and 3a.

In this way swinging of the cam does not lead to any variation in the angle A and the wedging angle V which is related to the angle A does not vary. In practice it may be said that the wedging angle does not vary for a relatively small variation in the inclination of the cam 1 with respect to its initial position.

In order for this to take place it is necessary and sufficient for the normal to the bearing race 4 at the point 8 to be perpendicular to the line 2a, 3a at 2a.

If B is the angle formed between the normal to the race 5 at the point 9 and the line 2a, 3a it follows that:

$(3a,2a)/(\text{Sin } A) = (3a,12)/\text{Sin } (A+B)$        2 and from Formula (2) it is possible to derive the variation in the angle $A$, that is to say that of the angle $V$, as a function of the variation of the angle B which represents the inclination of the cam:

$dA/dB = [K, \text{Cos } (A+B)]/[\text{Cos. } A - K \text{ Cos } A+B]$        3

It will thus be seen that the variation in the angle A will be zero if $A+B = 90°$, which amounts to saying that the normal to the bearing race 4 at the point 8 is perpendicular at 2a to the line 2a, 3a.

The fact that the normal at the point 8 to the bearing race 4 is tangent to the circle centered at 3a and having a radius equal to the distance separating the centers 2a and 3a may also be expressed in another manner. Geometrically it is easy to see that the preceding result is obtained in the same manner when the centers 2a and 3a are on a circle, the diameter of which is a straight line connecting the center 3a to the common center 12 of the two races 4 and 5. For clarity, it may be said that the axes materialized by the points 2a and 3a of the cylindrical contact surfaces 2 and 3 and the common axis of the two races materialized by the point 12 are the generatrices of a cylindrical locus 10, the diametral plane of which is defined by the axis of the races 4 and 5 and the axis of the surface 3 in contact with the internal race 5.

Figure 3:
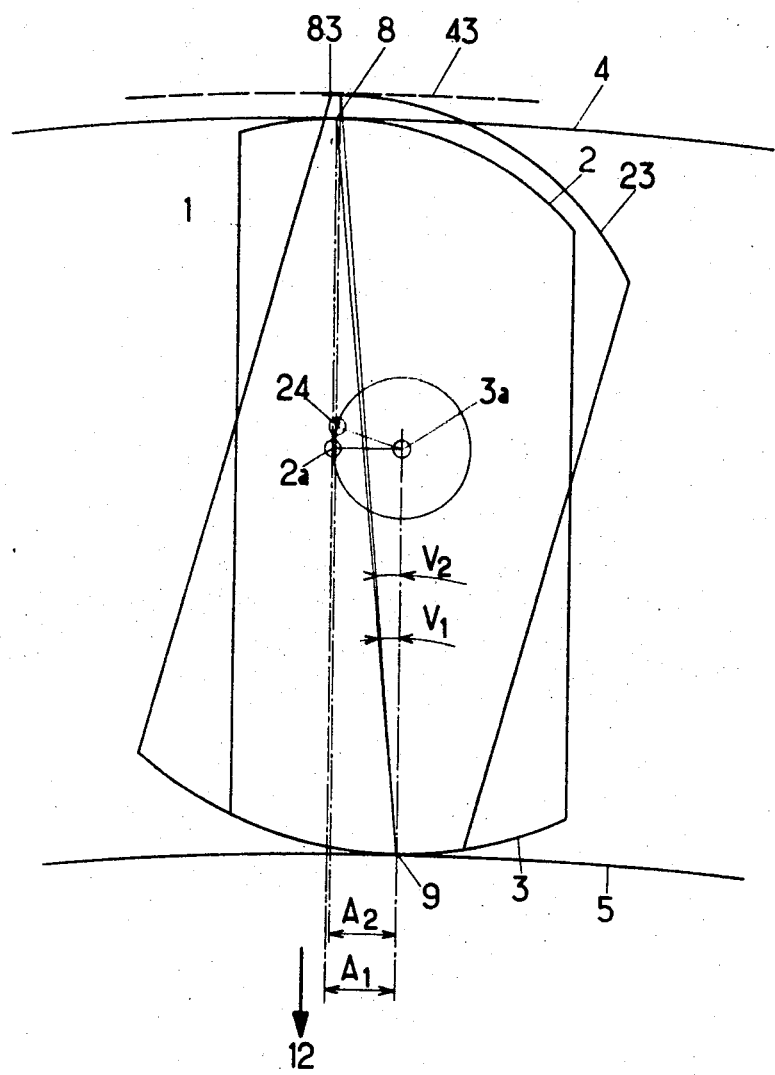
FIG. 3 shows two successive positions of the wedging cam.

FIG. 3 illustrates the invention schematically. This figure shows a wedging cam 1 identical to the one shown in FIG. 1. It is in contact at the point 8 with the external race 4 and at the point 9 with the internal race 5.

In this position, the normal at 8 to the external bearing race 4 is perpendicular to the line 2a, 3a, that is to say tangent to the circle centered at 3a, having the radius 2a, 3a. The wedging angle $V_1$ corresponds to $A_1$.

For purposes of illustration let it be assumed that the cam 1 rotates about a fixed point 3a rolling on the internal race 5 with the point of contact always numbered 9.

The surface 2 of the cam then moves to the position 23 in which it is in theoretical contact at the point 83 with the external race 43.

In reality it is obvious that the internal and external races deform resiliently in the regions of contact.

FIG. 3 shows that the center 2a moves to the position 24 which is always located on the circle centered at 3a having the radius 2a, 3a. It will be appreciated that because, in the first position, the normal at 8 to the race 4 is tangent to the circle contered at 3a the change in the position of the center 2a to 24 does not result in any more than a very slight variation in the angle A which rises from the value $A_1$ to the value $A_2$. The wedging angle $V_2$ is practically equal to the wedging angle $V_1$.

In order to obtain a maximum and equal pressure in the regions of contact embracing the points 8 and 9 during wedging, that is to say during movement of the outer race 4 with respect to the inner race 5 in a direction opposite to the arrow 11, the radius 2b of the contact surface 2 has been selected a little smaller than the radius 3b of the contact surface 3 of the wedging cam 1. The different lengths of these radii are advantageously so selected that the Hertz pressure on the two races 4 and 5 is equal.

Figure 2:
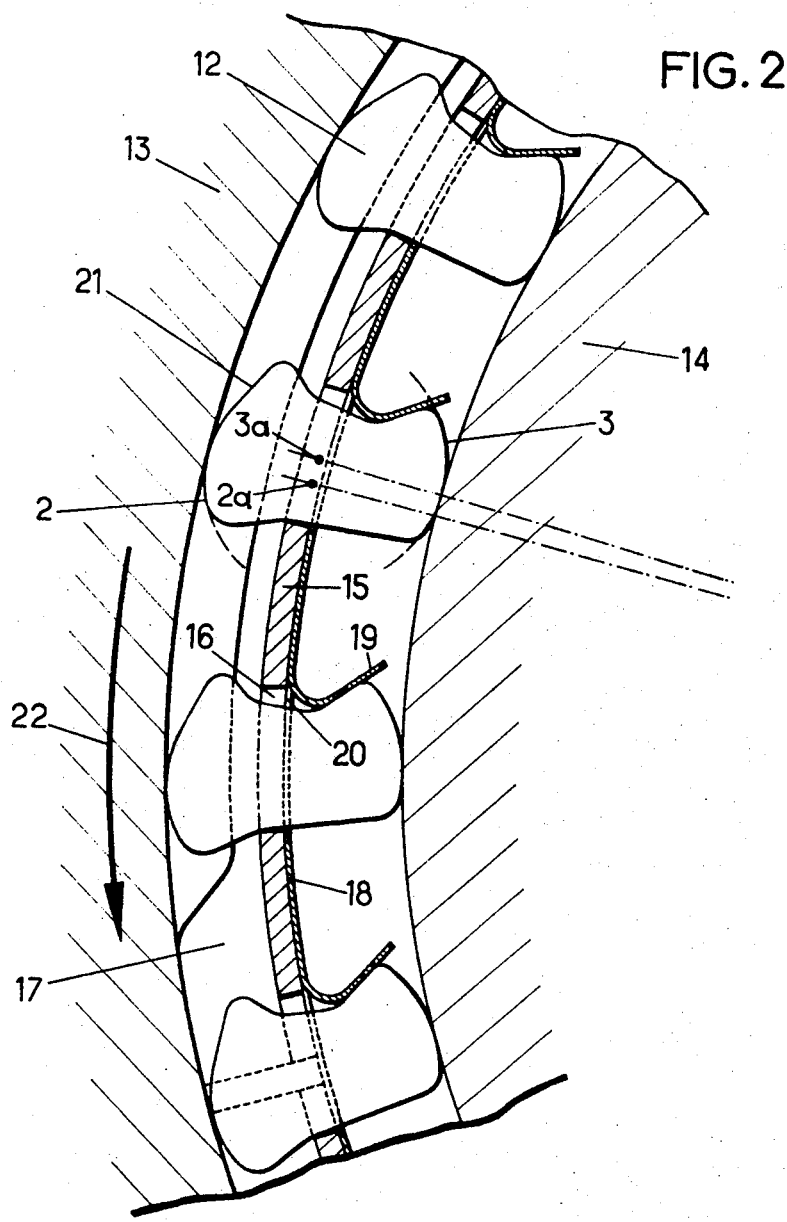
FIG. 2 is a sectional view through a free wheel drive according to the present invention utilizing wedging cams having contact surfaces of the type illustrated in FIG. 1.

FIG. 2 is a partial sectional view showing a free wheel drive utilizing wedging cams 12 analogous in principle to the cams 1 of FIG. 1. On FIG. 2 the drive according to the invention comprises a bore 13 and a ring 14 serving essentially the same roles as the races 4 and 5 of FIG. 1. The cams 12 are held in the cage 15 which has openings 16 adapted to the dimensions of the cams 12. The cage 15 may be attached to the bore 13 by bosses 17. A single spring 18 of a substantially cylindrical shape is provided with tongues 19 and openings 20 so as to hold the cams 12 in contact with the bore 13 and the ring 14.

FIG. 2 shows that the cams 12 have two cylindrical contact surfaces 2 and 3, the respective axes 2a and 3a of which are generatrices of a cylindrical locus concentric with the ring 14 and the bore 13 when the cams 12 are in contact with the ring 14 and the bore 13.

The wedging cams 12 have moreover a flat release surface 21 which makes it possible to simplify the machining of these cams. It will be seen that, when freewheeling, that is to say when the bore 13 moves with respect to the ring 14 in the direction of the arrow 22, the flat surface 21 replaces an unused portion of the cylindrical surface 2.

Finally, the lateral surfaces of the wedging cams 12 have shapes adapted to that of the spring 18 and the openings 16 in the cage 15, so as to ensure that the assembly constituted by the cage 15, the spring 18, and the wedging cams 12 will hold together even before it is mounted between the bore 13 and the ring 14.

By the way of example, a drive according to the invention may have the following dimensions:

$2a, 3a = 2$ mm
$R_2 = 36$ mm
$3b = 4$
Initial angle $A = 1°$
$R_1 = 89$ mm

Under these conditions a variation of 0.5° in the wedging angle results from an inclination of 10° by the cam.

By way of comparison, a wedging cam of a conventional type in which the angle $A+B$ is initially equal to about 45° results in a variation of 2° in the wedging angle, that is to say 4 times greater for the same 10° inclination of the cam.

In conclusion, the present invention makes it possible to provide free wheel drives in which the wear on the races is identical and kept at a very low level. In the free wheel drive according to the invention the nominal wedging angle may be selected at a particularly high value which may be as great as 6° and in any case greater than 5°. This makes it possible to obtain excellent transmission of torque by wedging action while substantially limiting the wear on the races. Finally, the fact that there is no variation in the wedging angle when the cams swing makes it possible to tolerate greater inaccuracies in the machining of the different parts in contact with each other, and especially in the races constituted by the surfaces of the ring and bore.

What is claimed is:

1. In a free wheel drive comprising two concentric cylindrical races, a plurality of wedging cams, and a cylindrical cage and a resilient member which maintain said cams in contact with said races, the improvement according to which the cams have two cylindrical surfaces, one in contact with each of the races, the axes of the cylindrical surfaces of each of said cams and the common axis of the two races being generatrices of a cylindrical locus the diametral plane of which is defined by the common axis of the two races and the axis of the cylindrical surface of one of the cams in contact with the internal race.

2. Free wheel drive as claimed in claim 1 in which the radius of curvature of those surfaces of the cams in contact with the external race is greater than the radius of curvature of those surfaces of the cams in contact with the internal race so as to balance the pressures against the regions of contact during wedging.

* * * * *